United States Patent [19]

Kelly

[11] Patent Number: 4,602,500

[45] Date of Patent: Jul. 29, 1986

[54] APPARATUS FOR LEAKAGE TESTING OF TUBES AND JOINTS

[75] Inventor: John W. Kelly, Burbank, Calif.

[73] Assignee: Haskel, Inc., Burbank, Calif.

[21] Appl. No.: 771,029

[22] Filed: Aug. 30, 1985

[51] Int. Cl.[4] ............................................. G01M 3/14
[52] U.S. Cl. ........................................ 73/49.8; 138/90;
411/55; 411/65; 73/46
[58] Field of Search ................. 73/49.8, 46, 49.1, 49.5;
138/90, 89; 411/55, 57, 44, 63–68; 220/235,
237, 238

[56] References Cited

U.S. PATENT DOCUMENTS

| | | | |
|---|---|---|---|
| 1,949,498 | 3/1934 | Stone et al. | 220/235 |
| 2,062,519 | 12/1936 | Ljungberg | 220/237 |
| 2,342,616 | 2/1944 | O'Brien | 73/46 |
| 2,375,995 | 5/1945 | Kaeser | 138/90 |
| 2,507,124 | 5/1950 | Stillinger | 73/49.6 |
| 2,607,370 | 8/1952 | Anderson | 220/238 |
| 2,937,666 | 5/1960 | Maisch | 138/89 |
| 3,029,630 | 4/1962 | Cummins | 73/46 |
| 3,323,551 | 6/1967 | Bell et al. | 138/90 |
| 3,882,715 | 5/1975 | Slinger | 73/46 |
| 3,950,983 | 4/1976 | Slinger | 73/46 |
| 4,282,982 | 8/1981 | Nuesslein | 220/237 |
| 4,382,379 | 5/1983 | Kelly | 73/49.8 |

FOREIGN PATENT DOCUMENTS

| 2490297 | 3/1982 | France | 411/65 |
|---|---|---|---|
| 2022756 | 12/1979 | United Kingdom | 411/55 |

Primary Examiner—Stewart J. Levy
Assistant Examiner—Hezron E. Williams
Attorney, Agent, or Firm—Pretty, Schroeder, Brueggemann & Clark

[57] ABSTRACT

A leakage testing apparatus includes a pull bar surrounded by an array of arcuate segments having teeth that engage and deform the inner surface of a tube. When tension is applied to the pull bar, a cam forces the segments to move outwardly to contact the tube while maintaining a parallel relationship to said pull bar.

18 Claims, 3 Drawing Figures

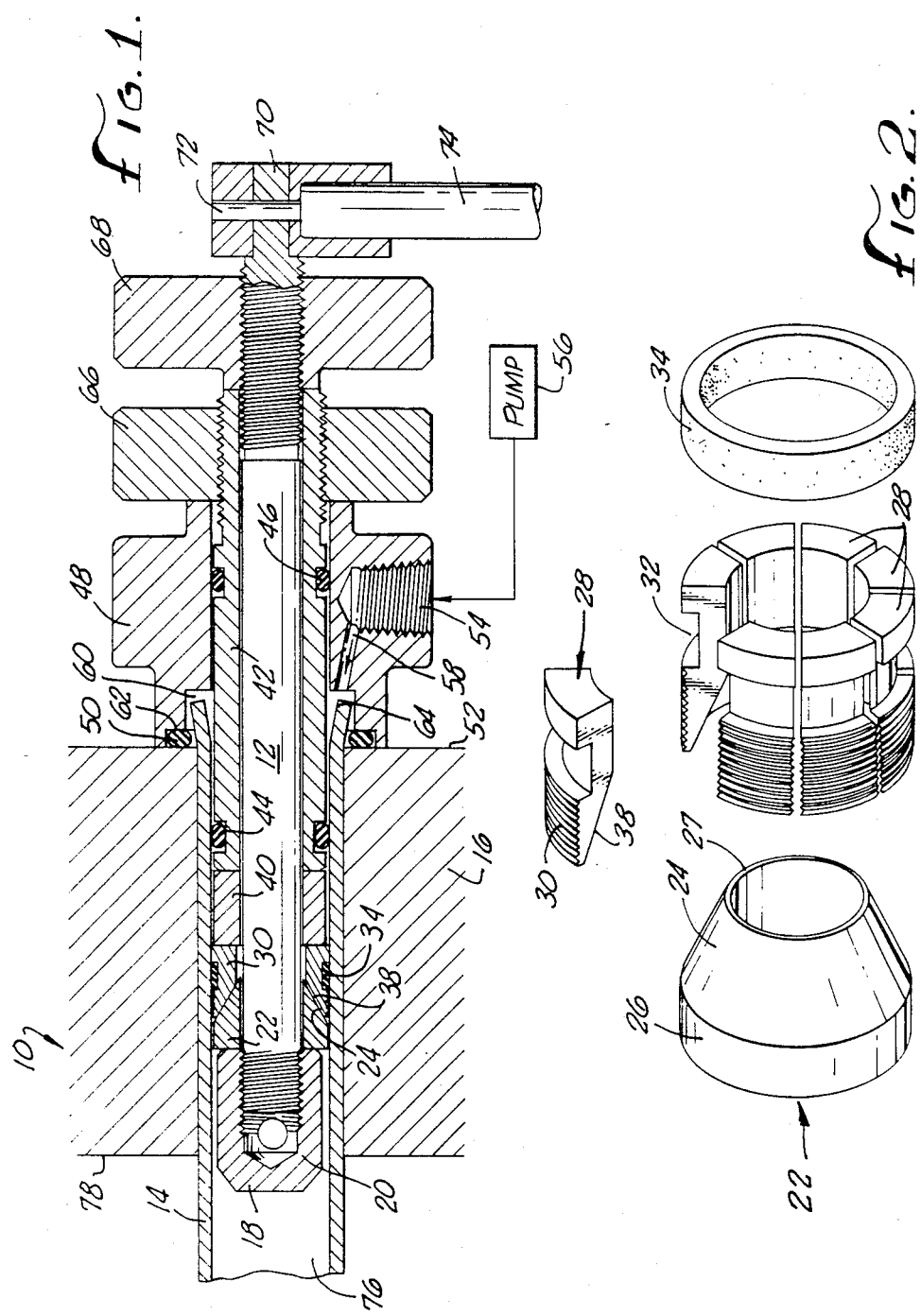

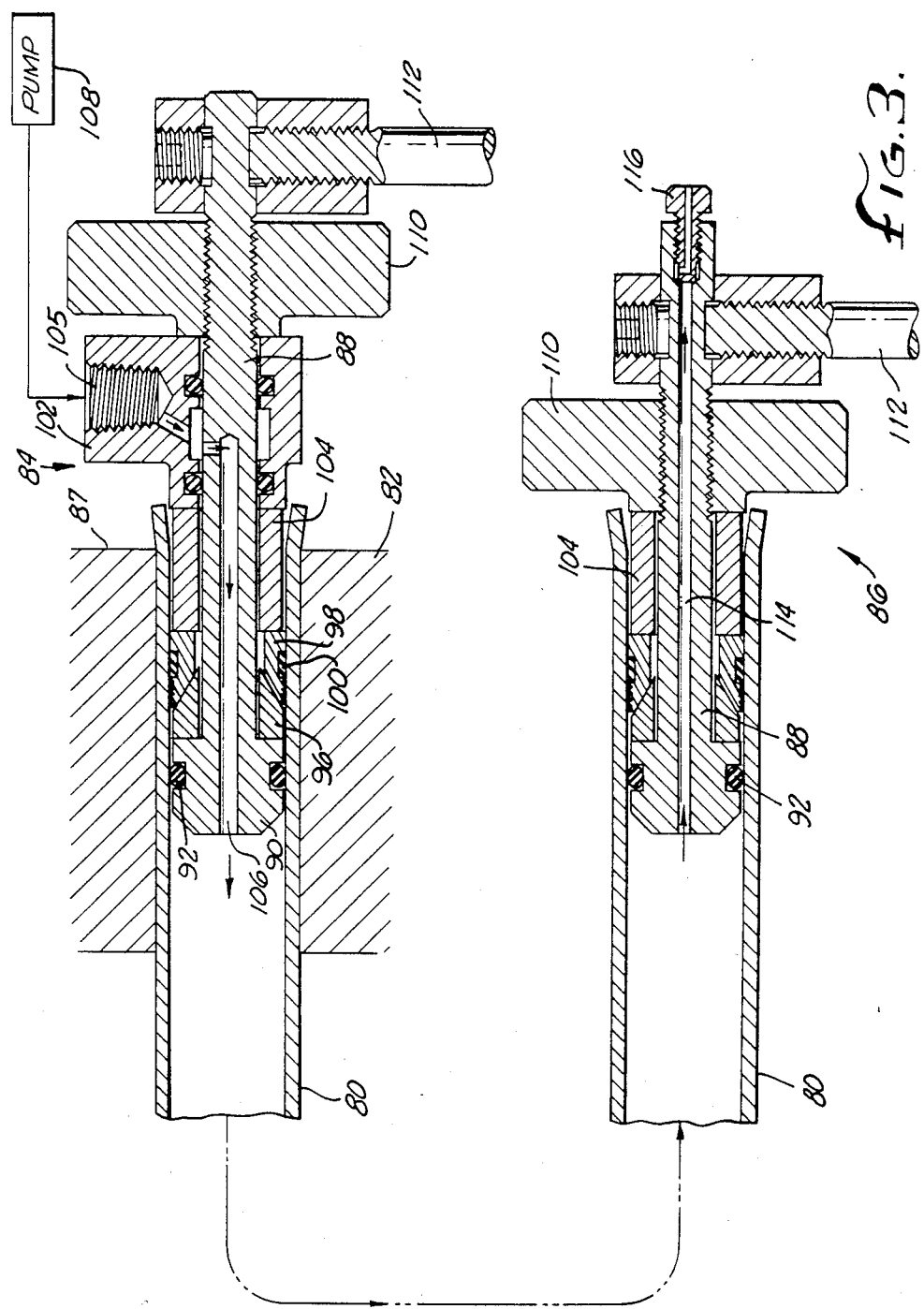

APPARATUS FOR LEAKAGE TESTING OF TUBES AND JOINTS

FIELD OF THE INVENTION

The present invention relates to leak detection and, more particularly, to apparatus for detecting leaks in tubes and for detecting leaks between tubes and surrounding structures such as tube sheets.

BACKGROUND OF THE INVENTION

A variety of equipment such as ship's boilers, stationary electrical power generation plants and other heat exchangers employ numerous tubes through which pressurized fluid passes. An important aspect of the construction and maintenance of such equipment is testing for leaks. Leaks can occur in the tubes themselves or in the joints formed, usually by swaging, between the tubes and the tube sheets that the tubes pass through.

A common practice in testing for leaks is to pressurize the entire system and then inspect for escaping fluid. This approach, however, is problematic. With all tubes and joints pressurized at once, it can be difficult to be certain of the exact source of leaking fluid. Moreover, starting up and pressurizing the entire system for test purposes can be costly and time-consuming. In some situations it is desired to test a partially completed system that cannot be fully pressurized because it is not yet operational.

One solution to the problem of testing an individual joint is described in the inventor's earlier U.S. Pat. No. 4,382,379. However, that apparatus can be used only with a relatively short tube, both ends of which are accessible. It is useful primarily for testing joint forming procedures using short lengths of tube.

Other leak testing apparatus are known in which a cable extends through a tube to anchor the apparatus. In addition, there are radially expandable tube plugs that can be used in combination with test apparatus. However, none of these known devices and techniques have proven entirely satisfactory, especially when used with large heat exchangers and high pressures.

Accordingly, there is a need for an improved apparatus for leakage testing that overcomes disadvantages associated with previously known apparatus and techniques.

SUMMARY OF THE INVENTION

A leakage testing apparatus includes a pull bar having a free end for axial insertion in a tube. A plurality of separate arcuate segments are arranged to encircle the bar, each segment having teeth that engage and deform the inner surface of the tube to prevent axial movement. The segments are urged inwardly against the bar by a resilient band which may be disposed in a groove in the segments.

Axial tensioning of the bar causes a cam to push the segments radially outwardly against the tube while the segments remain parallel to the bar. Preferably, the cam and the segments define mating conical surfaces and the cam is surrounded by the resilient band.

The axial tensioning force cam be applied to the cam by an end cap carried by the bar. The force can be applied to the bar by a first member that applies torque to the bar and a second member that threadedly engages the bar and is rotatable with respect to it.

In one form of the invention useful for detecting leaks between a tube and a surrounding structure, the apparatus includes a head with an outer seal arranged to engage the surrounding structure to prevent the escape of fluid. An inner seal encircles the pull bar and is engageable with the inner surface of the tube to prevent fluid from flowing past the inner seal and farther into the tube. Fluid can be supplied through a passageway in the head to flow up to the inner and outer seals.

In another form of the invention suitable for testing for leaks throughout the length of the tube, a passageway for pressurized fluid extends axially through the pull bar to the free end thereof. A seal to prevent escape of the fluid can encircle the end cap of the pull bar.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a cross-sectional view of an apparatus that embodies the present invention, the cross-section being taken substantially along the longitudinal axis of the pull bar;

FIG. 2 is an exploded perspective view of the cam, segments and resilient band of the apparatus; and FIG. 3 is a partially diagrammatic cross-sectional view of another embodiment of the invention for detecting leaks throughout the length of the tube.

DESCRIPTION OF THE PREFERRED EMBODIMENT

An exemplary leakage detection apparatus 10, constructed in accordance with the present invention and shown in FIGS. 1 and 2 of the drawings, includes an elongated cylindrical pull bar 12 that is inserted axially in a tube 14. A joint to be tested for leaks has been formed by swaging between the outer surface of the tube 14 and a surrounding structure 16, in this case a tube sheet.

The free end 18 of the pull bar 12 within the tube 14 is threaded and receives an end cap 20, the outer diameter of which is slightly smaller than the inside diameter of the tube. Encircling the pull bar 12 adjacent to the cap 20 is a steel cam ring 22. On one end of the cam ring 22, facing away from the end cap 20, has a conical cam surface 24, best shown in FIG. 2. The cam surface 24 extends from a cylindrical portion 26 of the cam ring to a thin circumferential leading edge 27.

On the opposite side of the cam ring 22 from the cap 20 is a cylindrical array of arcuate, rigid steel segments 28 arranged to encircle the pull bar 12. Each segments 28 carries a series of elongated ridge-like circumferential teeth 30 on its outer surface which, when viewed in transverse cross-section, form serrations (see FIG. 2) that oppose the inner surface of the tube 14. The segments 28 also define a circumferential groove 32 in which a resilient polyurethane band 34 is disposed to urge the segments radially inwardly against the pull bar 14.

The inner surface 38 of each segment 28 is cylindrical at the end farthest form the can ring 22, but forms a conical separation surface 38 at the opposite end that mates with the cam surface 24. The separation surface 38 and the cam surface 24 thus form the same angle with the longitudinal axis of the pull bar 12.

Adjacent to the segments 28 is a spacer ring 40 which abuts against an elongated sleeve 42 that extends along the pull bar 12 out of the tube sheet 16. This sleeve 42 has two annular grooves on its outer surface that carry O-ring seals 44 and 46, the inner seal 44 being within the tube sheet 16 and the other seal 46 being outside the tube sheet. The pull bar 12 is axially slidable within the segments 28, the spacer ring 40 and the sleeve 42.

A portion of the sleeve 42 positioned immediately outside the tube sheet 16 is axially slidable within an annular head 48, the outer seal 46 being positioned within the head. The head 48 carries a face seal 50 that is engageable with a flat primary side 52 of the tube sheet 16. A threaded port 54 in the head 48 facilitates connection of a pump 56 to a passageway 58 leading to an annular cavity 60 formed in the head and opening toward the tube sheet 16, the cavity defining an annular shoulder 62 on which the face seal 50 rests. The cavity 60 is large enough to receive a flared end 64 of the tube 14 that protrudes from the primary side 52 of the tube sheet 16.

On the opposite side of the head 48 from the tube sheet 16 is an annular seating knob 66 that is internally threaded to mate with the sleeve 42. Thus, rotation of the seating knob 66 causes relative axial movement of the sleeve 42.

Abutting against the outer end of the sleeve 42 is a reference knob 68. Like the seating knob 66, it is internally threaded and it thus engages the pull bar 12. The end 70 of the pull bar 12 extends from the reference knob 68 and is connected by a pin 72 to a lever 74 so that the lever can be used to turn or hold the bar. Other levers (not shown) are connected to the knobs 66 and 68.

The operation of the apparatus 10 to test for leaks is as follows. First the pull bar 12 is inserted in the tube 14. The reference knob 68 is held against rotation while the pull bar 12 is rotated by the lever 74. Because of the threaded engagement between the bar 12 and the knob 68, the bar 12 is caused to move axially in the direction of withdrawal from the tube 14. However, the sleeve 42 cannot move axially with the bar 12 because it abuts against the reference knob 68. Therefore, the end cap 20 pushes the cam ring 22 toward the primary side 52 of the tube sheet 16, while the sleeve 42 and the spacer ring 40 prevent the segments 28 from moving axially. The cam surface 24 of the ring 22 pushes radially outwardly on the separation surfaces 38 of the segments 28, stretching the band 34 and causing the teeth 30 to press against the inner surface 76 of the tube 14, deforming the tube and biting into it. In this way, the pull bar 12 is firmly held against axial movement within the tube 14 and there is no need for access to the apparatus 10 from the secondary side 78 of the tube sheet 16.

To achieve optimum contact between the segments 28 and the tube 14 for maximum holding power, it is desired that the segments remain parallel to the pull bar 12 as they move outwardly, retaining a generally cylindrical configuration. All the serrations 30 thus contact the tube 14 firmly despite the fact that the outward force applied to the segments 28 is all from the direction of the free end of the pull bar 12. Since only one cam ring 22 is used, frictional forces are minimized. The segments 28 should not pivot as they move in response to the cam ring 22 and the components should be shaped and dimensioned to produce the desired parallel movement. In this exemplary embodiment, the angle between the longitudinal axis of the pull bar 12 and the cam surface 24 or the spreader surface 28 is advantageously about 30 degrees (when viewed along a cross-section taken through the longitudinal axis of the pull bar, as in FIG. 1).

It is also important that the cam ring 22 extend well into the segments 28 since the axial extension of the segments beyond the ends of the cam ring toward the primary side 52 tends to cause pivoting of the segments 28. The conical separation surfaces 38 of the segments 28 should extend into the area surrounded by the resilient band 34 so that the inwardly directed reaction force of the band will be aligned with the outwardly directed force of the cam ring 22.

Once the pull bar 12 has been anchored within the tub 14 by expanding the segments 28 radially, the face seal 50 carried by the head 48 is seated firmly against the primary surface 52. This is accomplished by holding the reference knob 68 and turning the seating knob 66. Since the seating knob 66 threadedly engages the sleeve 42, it must move axially toward the primary surface 52 as it turns, thus pressing the seal 50 against the primary surface. The apparatus 10 is then ready for leak detection to begin.

Pressurized water or other hydraulic fluid from the pump 56 flows through the passageway 58 into the cavity 60. It can then flow along the annular space between the tube 14 and the sleeve 42 to the inner seal 44 and it can flow between the sleeve and the head 48 to the outer seal 46. The face seal 50 prevents the fluid from flowing between the head 48 and the primary surface 52. The fluid is thus confined unless there is leakage between the tube 14 and the tube sheet 16, in which case the fluid will flow along the outside of the tube and appear at the secondary side 78 of the tube sheet.

A second exemplary embodiment of the invention, shown in FIG. 3, is used not to detect leaks in the joint between a tube 80 and a tube sheet 82, as in the apparatus 10 of FIGS. 1 and 2, but to test for leaks within the tube itself. For this purpose, each end of the tube 80 is plugged by an apparatus 84 or 86 similar in many ways to the apparatus 10 described above.

The apparatus 84, inserted from the primary side 87 of the tube sheet 82, includes an elongated cylindrical steel pull bar 88 with an integrally formed enlarged inner end 90 that carries an O-ring seal 92 to prevent fluid from flowing out one the end of the tube 80 at the primary side 87 of the tube sheet 82. Adjacent to the enlarged end 90 of the bar 88 is a cam ring 96 that interacts with an array of arcuate segments 98 and an encircling resilient band 100, all of the same construction as the cam ring 24, segments 28 and band 34 described above (and shown best in FIG. 2).

Outside the tube sheet 82 is a head 102 in which the pull bar 88 is axially slidable. Separating the segments 98 from the head 102 is a sleeve 104 that is likewise axially slidable on the bar 88. A port 105 in the head 102 leads to a passageway 106 by which pressurized fluid from a pump 108 can be supplied through the bar 88 to the tube. The bar 88 extends from the head 102 and passes through a reference knob 110, by which it is threadedly received, to a lever 112 by which the bar can be rotated.

At the opposite end of the tube 80, the apparatus 86 is of a construction generally similar to the apparatus 80 (the same reference numbers being used for corresponding components). The head 102 is omitted and the knob 110 directly engages the sleeve 104. Instead of the passageway 106 heading to the pump 108, a passageway 114 continues axially throughout the length of the bar 88 to a removable bleed cap 116 at the outer end.

In operation, the two plug apparatus 84 and 86 are inserted in opposite ends of the tube 88. By holding the knobs 110 and turning the levers 112, the pull bars 88 are each moved a short distance toward the nearest end of the tube 80, causing the segments 98, which are provided with teeth, to deform and bite into the tube 80. Pressurized fluid from the pump 108 is then admitted to the tube 80 through the passagewa 106 and air in the tube is bled through the passageway 114. Once the tube 80 has been pressurized, it can be readily checked for leaks without pressurizing the entire system It should be noted that pressure within the tube 80 tends to push the pull bars 88 out of the ends of the tube, thus driving the cam rings 96 into the segments 98. The higher the pressure becomes, the more tightly the segments 98 grip the tube 80. The apparatus 84 and 86 may therefore be said to be self-energizing.

While particular forms of the invention have been illustrated and described, it will be apparent that various modifications can be made without departing from the spirit and scope of the invention.

I claim:

1. An apparatus for detecting leaks between a tube and surrounding structure, said apparatus comprising:
   a head including an outer seal arranged to engage said surrounding structure and prevent fluid from passing between said head and said surrounding structure;
   an elongated pull bar extending from said head for axial insertion of a free end thereof in said tube;
   a plurality of separate arcuate rigid segments arranged to encircle said pull bar, each of said segments having teeth thereon for engaging and deforming the inner surface of said tube to prevent axial movement of said segments relative to said tube, said segments each having a spreader surface thereon that defines part of the surface of a cone surrounding said pull bar;
   resilient means for urging said segments radially inwardly toward said pull bar;
   tensioning means for urging said free end of said pull bar toward said segments;
   cam means disposed between said free end and said segments responsive to axial movement of said pull bar for forcing said segments to move radially outwardly against said tube while maintaining a parallel relationship to said pull bar;
   an inner seal encircling said pull bar and engagable with the inner surface of said tube to prevent fluid from flowing past said inner seal farther into said tube; and
   a passageway extending through said head whereby fluid can flow up to said outer and inner seals.

2. The apparatus of claim 1 wherein said pull bar extends through said head to said tensioning means and is axially movable within said head.

3. The apparatus of claim 2 wherein said tensioning means comprises a first member for applying torque to said pull bar and a second member that threadedly engages said pull bar and is rotatable with respect thereto for applying an axial restraining force to said segments.

4. The apparatus of claim 3 further comprising seating means for urging said head axially with respect to said pull bar against said surrounding member, said seating means comprising an additional member that threadedly engages said pull bar and is rotatable with respect thereto.

5. The apparatus of claim 1 wherein said segments are arcuate and said cam means comprises a cam ring encircling said pull bar, said cam ring having a conical cam surface thereon that mates with said spreader surfaces.

6. The apparatus of claim 1 wherein said segments are arcuate and said cam means comprises a cam ring encircling said pull bar, said cam ring having a conical cam surface thereon at least of portion of which is surrounded by said resilient band.

7. The apparatus of claim 6 wherein said cam surface forms an angle of about 30 degrees with said pull bar.

8. The apparatus of claim 6 wherein said cam ring has a leading edge from which said cam surface extends, said leading edge being surrounded by said resilient band.

9. The apparatus of claim 1 wherein said segments define a circumferential groove and said resilient means comprises a band disposed within said groove.

10. The apparatus of claim 1 further comprising an end cap carried by said pull bar and arranged to prevent axial movement of said cam means along said pull bar.

11. An apparatus for detecting leaks between a tube and a surrounding structure, said apparatus comprising:
    a head including an outer seal arranged to engage said surrounding structure and prevent fluid from passing between said head and said surrounding structure;
    an elongated pull bar extending through said head and axially slidable therein to be inserted axially in said tube;
    a plurality of separate arcuate rigid steel segments arranged to encircle said pull bar and defining a circumferential groove on the outer surface thereof, each of said segments having elongated ridge-like circumferential teeth thereon for engaging and deforming the inner surface of said tube to prevent axial movement of said segments relative to said tube, said segments each having a spreader surface thereon that defines parts of the surface of a cone surrounding said pull bar;
    a resilient band surrounding said segments, disposed within said groove and urging said segments radially inwardly toward said pull bar;
    tensioning means for urging said free end of said pull bar toward said segments, said tensioning means including a first member for applying torque to said pull bar and a second member that threadedly engages said pull bar and is rotatable with respect thereto for applying an axial restraining force to said segments;
    seating means for urging said head axially with respect to said pull bar against said surrounding member, said seating means comprising an additional member that threadedly engages said pull bar and is rotatable with respect thereto;
    cam means responsive to axial movement of said pull bar for forcing said segments to move radially outwardly while maintaining a parallel relationship to said pull bar, said cam means comprising a cam ring encircling said pull bar, said cam ring having a conical cam surface thereon that mates with said spreader surfaces, forms an angle of about 30 degrees with said pull bar and at least part of which is surrounding by said resilient band;

an inner seal encircling said pull bar and engageable with the inner surface of said tube to prevent fluid from flowing past said inner seal into said tube; and a passageway extending through said head whereby fluid cam flow up to said outer and inner seals.

12. An apparatus for detecting leaks between a tube and surrounding structure, said apparatus comprising:

a head to be disposed outside said surrounding structure;

an elongated pull bar extending from said head for axial insertion of a free end thereof in said tube;

a plurality of separate arcuate rigid segments arranged to encircle said pull bar, each of said segments having teeth thereon for engaging and deforming the inner surface of said tube to prevent axial movement of said segments relative to said tube, said segments each having a spreader surface thereon that defines part of the surface of a cone surrounding said pull bar;

resilient means for urging said segments radially inwardly toward said pull bar;

tensioning means for urging said free end of said pull bar toward said segments;

cam means disposed between said free end and said segments responsive to axial movement of said pull bar for forcing said segments to move radially outwardly against said tube while maintaining a parallel relationship to said pull bar;

a seal encircling said pull bar and engagable with the inner surface of said tube to prevent fluid from flowing past said said toward said head; and a passageway extending through said pull bar for supplying pressurized fluid to said tube.

13. The apparatus of claim 12, wherein said segments are arcuate and said cam means comprises a cam ring encircling said pull bar, said cam ring having a conical cam surface thereon that mates with said spreader surfaces.

14. The apparatus of claim 12 wherein said segments are arcuate and said cam means comprises a cam ring encircling said pull bar, said cam ring having a conical cam surface thereon at least a portion of which is surrounded by said resilient band.

15. The apparatus of claim 14 wherein said cam surface forms an angle of about 30 degrees with said pull bar.

16. The apparatus of claim 14 wherein said cam ring has a leading edge from which said cam surface extends, said leading edge being surrounded by said resilient band.

17. The apparatus of claim 12 wherein said segments define a circumferential groove and said resilient means comprises a band disposed within said groove.

18. The apparatus of claim 12 further comprising an end cap carried by said pull bar and arranged to prevent axial movement of said cam means along said pull bar.

* * * * *